HIGH FREQUENCY PIEZOELECTRIC SYSTEM

Filed June 10, 1959 4 Sheets-Sheet 1

Inventors:
Hans Awender &
Rudolf Stark

By [signature]
Patent Agent

Inventors:
Hans Awender &
Rudolf Stark

By [signature]
Patent Agent

HIGH FREQUENCY PIEZOELECTRIC SYSTEM

Filed June 10, 1959

4 Sheets-Sheet 3

Inventors:
Hans Awender &
Rudolf Stark
By [signature]
Patent Agent

HIGH FREQUENCY PIEZOELECTRIC SYSTEM

Filed June 10, 1959

4 Sheets-Sheet 4

Inventors:
Hans Awender &
Rudolf Stark

By [signature]
Patent Agent

United States Patent Office 3,188,584
Patented June 8, 1965

3,188,584
HIGH-FREQUENCY PIEZOELECTRIC SYSTEM

Hans Awender, Berlin-Nikolassee, and Rudolf Stark, Berlin-Tempelhof, Germany, assignors to Telefunken Aktiengesellschaft, Berlin, Germany Filed June 10, 1959, Ser. No. 819,281
29 Claims. (Cl. 333—72)

In the art relating to signal transmission, piezoelectric oscillating bodies are frequently used as frequency-selective components, such piezoelectric resonators when mounted between two electrodes can, for example, be substituted for an oscillating circuit comprising a coil and a condenser. This assembly including the electrodes acts as an oscillating circuit with low attenuation, which cannot be attained in any other electric or electromechanical oscillating arrangement.

Due to its remarkable high Q, such a piezoelectric resonator can be used very widely, not only in form of a two terminal network in the arrangement to be considered first herein, but also in the form of a four or $n$ terminal network in filter circuits of the bridge type, or in combination circuits with several other similarly or differently tuned piezoelectric bodies, or in the form of electromechanical transducer elements, wherein the piezoelectric body has several pairs of electrodes forming separate input and output terminals between which, in case of resonance, different resistance values appear.

In the conventional system of energizing piezoelectric bodies between plate-shaped electrodes which are small, as compared with a wave length of the electric energization, i.e., with a substantially homogenous field, such piezoelectric bodies can be used as transmission components only up to an upper frequency limit of about 200 megacycles, and then only if the bodies are excited at odd-numbered harmonics of their fundamental. The explanation of why it is not possible to obtain higher operative frequencies, based on the known principles of application of such components, can be obtained by considering the conditions of oscillation for a tube-type generator the frequency of which is stabilized by piezoelectric means.

In such a tube generator, a piezoelectric oscillating body which is generally made of quartz crystal, can be operated with a fundamental up to an upper frequency limit of about 20 megacycles. The characteristic values for such bodies are the following:

| | |
|---|---|
| Loss resistance | $R_0 \sim 15$ ohms. |
| Attenuation factor | $d_0 \sim 1.10^{-5}$. |
| Shunt capacity | $C_0 \sim 7$ pf. |
| Thickness of the plate | $\sim 83$ microns |
| Diameter of the plate | $\sim 8$ mm. |

At higher operating frequencies, the piezoelectric oscillating body has to be operated on an harmonic of its fundamental. In this case, it has to be realized that the loss resistance $R_{on}$ for the $n$th harmonic bears the following relation to the loss resistance $R_0$ for the case of the fundamental:

$$R_{on} \sim n \cdot R_0$$

This means that the loss resistance increases with the ordinal number $n$ of the harmonic. As a result of this, an upper frequency limit is reached beyond which it is not possible to sustain oscillations in the generator, because the higher the loss resistance, the greater must be the slope S of the tube characteristic, in order to obtain a high enough amplification $V=1$ within the feedback loop containing the piezoelectric body. The relation between the minimum slope S, sufficient for adequate excitation, and the loss characteristics of the piezoelectric body is given as follows:

$$S \sim n^3 R_0 f_0^2 C_0^2$$

wherein $f_0$ is the fundamental resonant frequency of the body employed. Thus, the requirements for the slope of the tube increase in proportion to $n^3$, $R_0$, $f_0^2$ and $C_0^2$. Oscillations at a frequency of 200 megacycles at maximum can be sustained by employing the tubes and piezoelectric bodies available at present. Similar practical frequency limits are obtained in case of application of piezoelectric oscillating bodies as pure resonators in filter systems.

It is an object of the present invention to make possible the use of piezoelectric bodies as frequency-sensitive components at higher frequencies than heretofore attained.

It is another object of the present invention to provide a frequency-sensitive electric component in the form of an $n$-terminal network containing a piezoelectric body designed in such a manner, that this $n$-terminal network includes a portion of a transmission line carrying a high-frequency wave containing an oscillating component having a frequency corresponding with the inherent resonance of the piezoelectric body, and in that the piezoelectric body which, at least in one dimension, has a size of the order of one quarter-wave length of said oscillating component, and said network being disposed in the transmission line field in such a manner, that at said frequency an electric coaction of substantial strength is obtained between said field and the body, due to the piezoelectric effect. A very pronounced coaction is obtained if the position of the piezoelectric body in the conductor field is selected in such a manner, that the distribution of the electric field through the body is matched to the distribution of the vibration pattern of the piezoelectric body at least within a rough approximation at said frequency. The kind and importance of such vibration pattern will be discussed below.

According to the present invention, care must be taken, when piezoelectric bodies are applied for useful purposes, that the electric energy which is actually dissipated within the body itself is within reasonable limits, said energy necessarily having to be greater than the minimum value at which the range of practical application starts and which energy is stored in the form of mechanical oscillating energy corresponding with a reactive or watt-less energy, or that the energy is converted into heat. The energy which can be dissipated in a piezoelectric body is limited by the natural limits of elastic deformation and temperature. These permissible limits are low, because of the small volume of piezoelectric bodies to be used at very high frequencies. The expansion of useful application to still higher frequencies would be expected to require either the use of harmonics of still higher order, or a further decrease in the size of the bodies. While the first possibility is limited by the mentioned increase in loss resistance, the limit in the second case is attributable to the difficulty involved in the mechanical working of the very thin oscillating bodies and to the approach of the available convertible energy to the aforementioned minimum value required for practical or commercial use.

This invention makes it possible to utilize harmonic oscillations of a still higher order, and at the same time, to employ oscillating bodies of correspondingly larger dimensions and lower fundamental resonant frequency. These dimensions may and should be within the order of a quarter wave length of the electromagnetic wave carried by the transmission line, with the desired result that the piezoelectric body within the transmission field covers a larger interaction cross-sectional area and is caused to coact with a greater number of electric-field lines. As a result of this, sufficient excitation is obtained also in fields of small energy density, which is particularly important in case of measuring and indicating systems.

Loss resistances of the piezoelectric body are relatively higher at higher harmonics. However, this is not disadvantageous in case of a frequency-sensitive component designed according to the invention; instead, it is a desirable property, because as a result of this, the absorption of the field energy is increased at the resonant mode used. Since the attenuation factor does not decrease in spite of the increase of the loss resistance with the ordinal number $n$ of the harmonic, the reactive or watt-less energy stored in the piezoelectric body is large where high order harmonics are used, so that excellent stabilizing properties are obtained, due to the small band-width obtainable. A piezoelectric body operated according to the present invention with a higher order harmonic can be compared with respect to its behavior with a flywheel which is braked by the high friction of the bearing, but also has a very high moment of inertia.

Optimum excitation conditions within the transmission field would be obtained if a major dimension of the piezoelectric body is approximately equal to a quarter wave length, or even larger. Satisfactory excitation conditions can be expected in substantial transmission fields in case of a major dimension up to $\frac{1}{10}$ of the said value. In case of disk-shaped piezoelectric bodies, having a diameter of 50 mm., as can be manufactured without difficulty, the optimum range starts at a wave length of approximately 20 cm. corresponding to 1,500 megacycles, and extends upwardly through a wide range of shorter waves and higher frequencies. The lower frequency limit of applicability of the assumed disk diameter in this example is 150 megacycles at a wave length of 200 cm.

By this invention, the desired extension of the range of application of the piezoelectric effect towards higher frequencies is obtained also, because the hereinafter discussed arrangement of such a body within a field permits various effects, which were heretofore disadvantageous, to be turned to provide favorable coaction. Due to the utilization of very much higher harmonics, it is possible, in accordance with the present invention, to select the fundamental resonant frequency of the oscillating body relatively low, so that it is no longer necessary to use very thin and correspondingly difficult-to-manufacture fragile bodies. The frequency range in which the components designed according to the invention can be used as frequency-selective means extends to the range of centimeter and millimeter waves in which heretofore, for example, it was necessary to employ for frequency stabilization so-called atom or molecular clocks, precession actions in the atom core or shell quadrupole-inherent frequency of the atom core, molecular rotation or oscillation frequencies, and hyper-fine structure-inherent frequencies (see: Radio-Mentor, 1957, vol. 10, page 675, "Atom-Uhren, Molekül-Uhren," by Dr. H. Awender).

The components according to the invention have the substantial advantage over known frequency standards that they are not limited to the single resonant frequency of the atom or molecule used, i.e., they can be manufactured for any selectable frequency with the result, that they can be used more extensively in the ultra high frequency technique. Thus a comercially usable frequency stabilizer of high precision in the ultra high frequency range is obtained in accordance with the present invention.

Tests have shown that valuable data relating to energizing of the piezoelectric body at higher harmonics can be obtained from the oscillating diagram. This diagram represents the picture of the distribution of the polarization of the oscillating body over its surface. The picture can be displayed as a luminescent image during excitation of the body in a rare gas maintained under low pressure, and results, so to speak, in an oscillating image which does not have to correspond with the pictures of the mechanical oscillation built up from the nodal lines.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURES 1*a*, 1*b* and 1*c* illustrate three oscillation pattern diagrams for a quartz body excited at three different harmonics of its natural fundamental;

Figure 20:
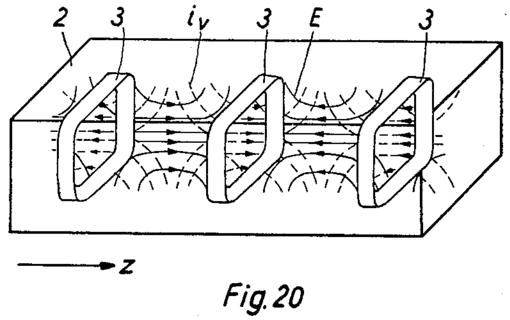
Figure 21:
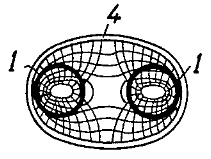
Figure 22:
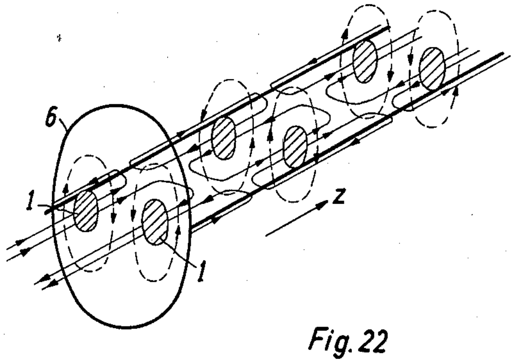
Figure 24A:
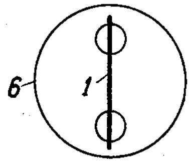
Figure 24B:
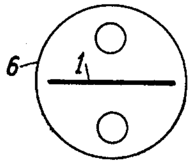
Figure 23:
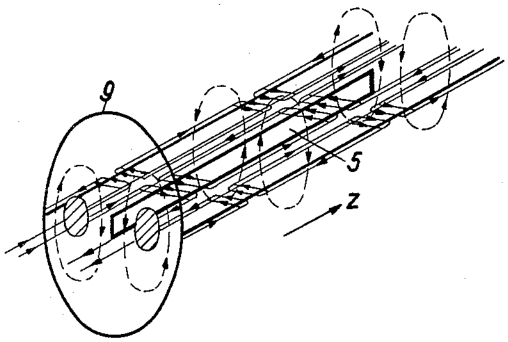
Figure 25:
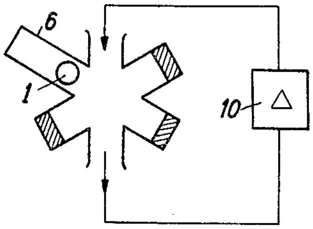

FIGURE 20 schematically illustrates in perspective a rectangular wave guide having a plurality of piezoelectric bodies spaced by $\frac{1}{2}\lambda$ along its length;

FIGURE 21 shows a sectional view through an elliptical hollow line having two inner conductors excited in the $E_{01}$ mode, and two circular piezoelectric bodies therein;

FIGURE 22 shows a schematic perspective illustration of six piezoelectric bodies coacting with an $E_{11}$ mode wave in a circular wave guide;

FIGURE 23 schematically shows in perspective an illustration of a rod-shaped piezoelectric body in a cylindrical wave guide and serving to orient the fields therein in a desired mode of propagation;

FIGURE 24*a* and 24*b* show a body in a circular wave guide and illustrate two possible relative orientations of the body with respect to the electric field $E_{11}$ mode therein; and FIGURE 25 is the schematic diagram of a microwave oscillator employing a piezoelectric body in the wave guide feedback path to determine the frequency of oscillation.

Figure 1A:
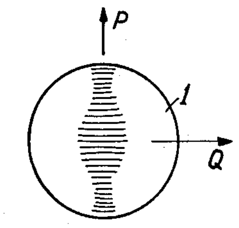
Figure 1B:
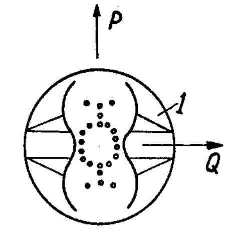
Figure 1C:
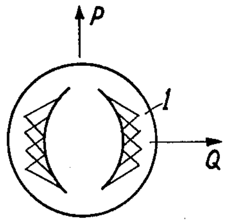

FIGURES 1*a*, 1*b* and 1*c* are three typical schematic oscillating diagrams resulting from energization or excitation of a disk-shaped quartz body at three harmonics different from one another in the neighborhood of 2 megacycles. The lines or points are luminescent spots, i.e., points of high oscillating potential. The polarities of the individual zones of high potential cannot be distinguished in the picture. This is not necessary for the above mentioned orientation of the piezoelectric body in the energizing transmission field according to the oscillation diagram.

By looking at FIGURES 1*a*, 1*b* and 1*c*, the shape of the oscillation patterns can be recognized as symmetrical with respect to two diameters of the circular body, said diameters being perpendicular with respect to one another. These diameters selected in this manner are designated by the axes-directions P and Q. They form the coordinates for defining a number of particularly advantageous locations of such piezoelectric oscillating bodies within particular electric fields. In this manner, a location of the piezoelectric oscillating body can be obtained in any event, wherein one of the axes of symmetry P or Q coincides or is approximately parallel with an axis of symmetry of the pattern of the electric field lines within a conductor, so that one of the larger surfaces of the piezoelectric body is at least parallel thereto. The mentioned pattern can be imagined as being composed of the points of penetration of the said larger surface by the electric field lines.

In order to explain the basic theory of the invention in terms of specific orientations of piezoelectric oscillating bodies within electric fields, reference is made to the drawings. Predominantly embodiments are illustrated in which the high frequency transmission line is a hollow wave guide. However, in some of the examples shown in the drawings, the high frequency line is of the long-line type or coaxial-line type.

Preferably, a Y-cut quartz resonator is used as the piezoelectric body, wherein the body generally has a plate or disk shape and one of its two large surfaces, or both of them, is intersected approximately perpendicularly by the electric field lines. If the wave guide field in this case is generated by a standing wave and the piezoelectric body is within the field of the standing wave, the body should be located close to the maximum of the electric field, so as to obtain as strong an excitation as possible. Such maxima of the electric field strength are separated by one half wave length each along the conductor. Correspondingly, piezoelectric bodies can be spaced one half wave length from one another along the wave guide. If the electric field is generated by a travelling wave in the conductor, the oscillating condition includes in time all possible conditions at the plane of the piezoelectric body, i.e., includes also the condition at which the maximum of the electric field strength occurs at the plane of the piezoelectric body. In this case, the selection of the location for the piezoelectric body along the conductor line is without importance. In other words, the position of the piezoelectric body within the field of the transmission is such that that portion of the field which intercepts the body and excites the latter as a frequency-selective resonator is, intermittently with respect to a substantially travelling wave and constantly with respect to a standing wave, non-homogeneous with the sign (±) of the direction of the lines of the field changing in such a manner that the distribution of the field corresponds at least approximately to the distribution of the vibration pattern of the piezoelectric body at such frequency.

FIGURES 2 to 15 show embodiments in which piezoelectric bodies assume different positions within the electric field of a wave guide. With the exception of FIGURE 3, all of these figures show the use of piezoelectric bodies in the form of plate-shaped, circular Y-cut quartz resonators designated by the reference character 1 in all of these figures. The wall of a rectangular- or square-shaped wave guide is denoted by the reference character 2 in all of the figures, except where the wall is cylindrical in the wave guide and is denoted by the reference numeral 6. The magnetic field lines are indicated by dotted lines in FIGURES 2 to 9, while the electric field lines are illustrated by uninterrupted lines. The directions of the field lines leaving the plane of the drawing are shown in the individual figures by a small circle with a dot in the center and the direction of the field lines entering the plane of the drawing are illustrated by a circle with a cross therein. A coordinate system $x$, $y$, $z$ is indicated for designating the various directions in the rectangular- or square-shaped hollow conductors. In the cylindrical hollow conductors, corresponding circular coordinates are used having the $z$-axis in the direction of the hollow conductor axis and having a radius vector $r$ under the azimuth $\beta$.

Figure 2:
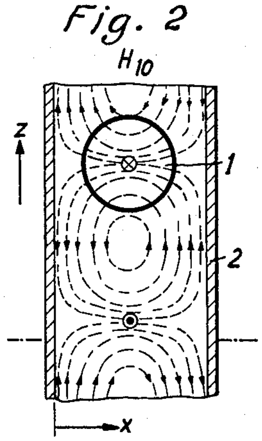
FIGURES 2 to 15 show sectional views through differently excited wave guides, also of different cross-sectional shapes, wherein piezoelectric bodies have been advantageously located, the bodies all being plate- or disk-shaped Y-cut quartz resonators, except for that shown in FIGURE 3.

FIGURE 2 illustrates the form of a field corresponding to an $H_{10}$ mode in a rectangular or square wave guide 2.

Figure 2A:
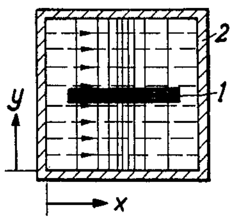

A disk-shaped piezoelectric body is arranged within this field in such a manner that one of its large surfaces is parallel with respect to the $y$-axis of the wave guide. In this case, as in most of the positions shown, the center of gravity of the disk-shaped piezoelectric body 1 is at least approximately located on the center axis of the wave guide. As shown in FIGURE 2*a*, the electric field lines pass through the large surfaces in a perpendicular direction.

Figure 3:
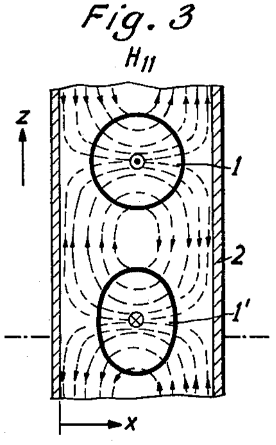
Figure 3A:
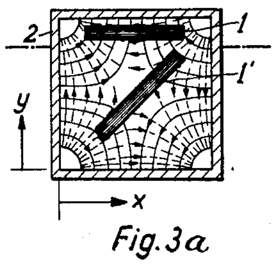

FIGURES 3 and 3*a* show a representation of the piezoelectric bodies in the field of an $H_{11}$ wave in two different positions. The body in one of the two positions is designated by the reference character 1, while the body in the other position is designated by the reference numeral 1'. The body indicated with the reference character 1 is arranged within the square-shaped wave guide in such a manner, that the surface vector of one of the large surfaces of the piezoelectric body, i.e., a vector which is perpendicular to the said surface is parallel to the $y$-axis of the hollow conductor. In this case, the disk-shaped piezoelectric body 1 is close to the wall of the hollow conductor. However, the body denoted by 1' is located within the same field pattern in such a manner, that one of its large surfaces is parallel to the diagonal plane $x=k \cdot y$ within the coordinate system of the hollow conductor. The surface vector of one of the large surfaces of the disk-shaped piezoelectric body 1' is perpendicular to the $z$-axis in the coordinate system and the P-axis of the body is parallel to the diagonal plane $x=k \cdot y$, and also parallel to the $z$-axis of the hollow conductor, when based on an oscillating pattern according to FIGURE 1*c*.

Figure 4:
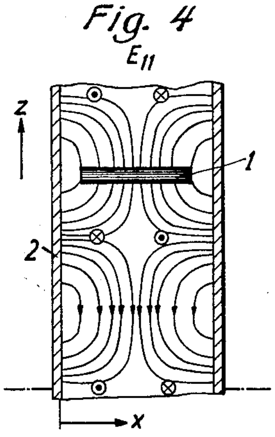
Figure 4A:
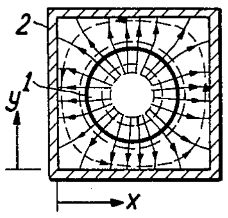
Figures 5A, 5B, 5C, 5D:
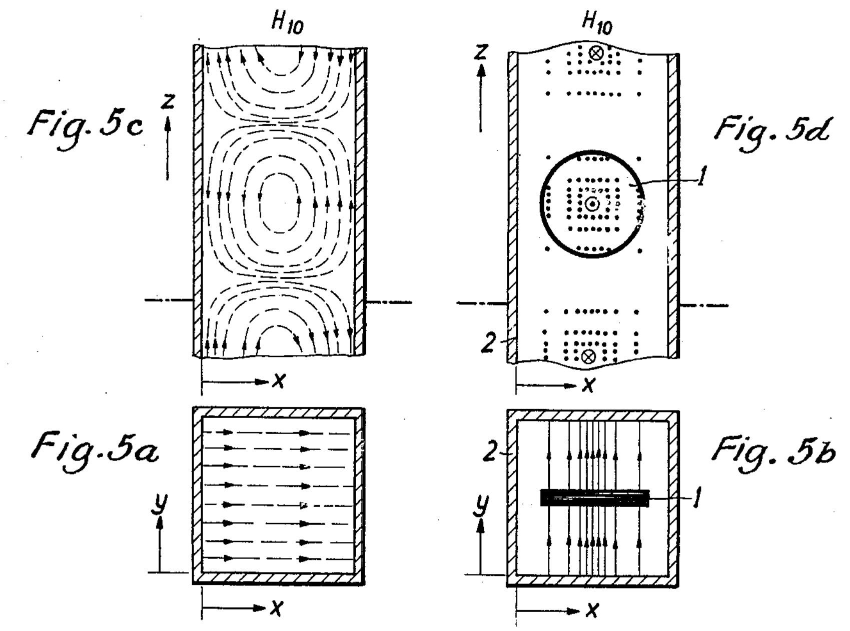

FIGURES 4 and 4*a* illustrate the position of a disk-shaped piezoelectric body 1 within the electric field of an $E_{11}$ wave is a square or rectangular wave guide, wherein the surface vector of one of the large surfaces of the piezoelectric body 1 is parallel to the $z$-axis of the coordinate system.

While in FIGURES 2 to 4, the field structure is illustrated as based on a traveling wave in which any shift of the piezoelectric body in the direction of the $z$-axis is possible, FIGURES 5*a*, 5*b*, 5*c* and 5*d* show the position of a piezoelectric body 1 within a square-shaped hollow conductor 2 carrying an $H_{10}$ standing wave. In such a field, the piezoelectric body 1 can be displaced by a whole multiple of one-half wave length in the $z$-direction.

Figures 6, 6A, 7, 7A, 8, 8A, 9, 9A:
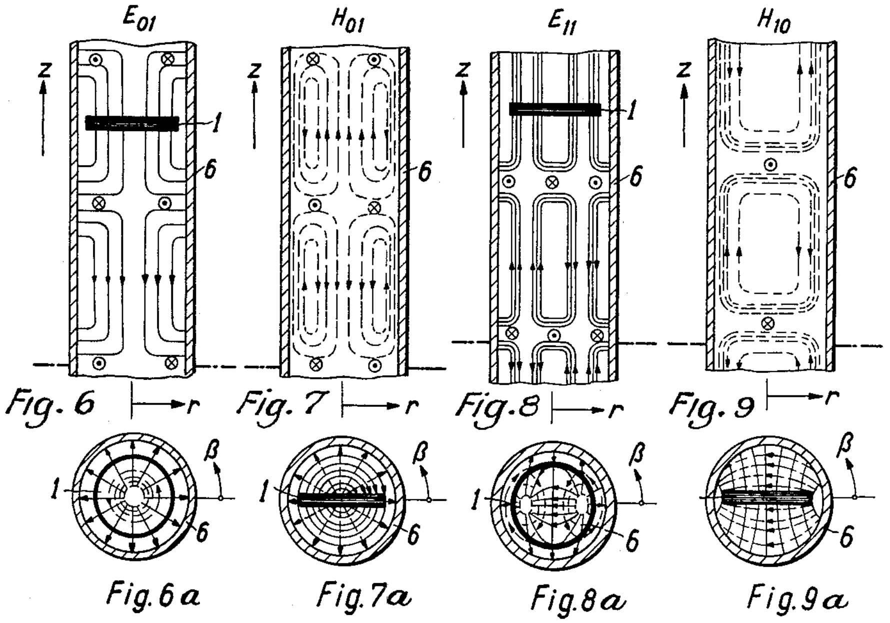

FIGURES 6 to 9 illustrate different positions of a disk-shaped piezoelectric body 1 within a cylindrical hollow conductor. In FIGURES 6 and 6*a*, the form of the electric field corresponding to an $E_{01}$ wave is assumed, wherein the surface vector of one of the large surfaces of the disk-shaped body is parallel to the $z$-axis in the coordinate system.

In a form of the electric field corresponding to an $H_{01}$ wave, as shown in FIGURES 7 and 7*a*, the piezoelectric body 1 is arranged in such a manner, that the surface vector of one of its large surfaces is parallel to the radius of the wave guide cross section and based on an oscillating pattern according to FIGURE 1*a* and the P-axis is perpendicular to the $z$-axis. Based on an oscillating pattern according to FIGURE 1*c*, the P-axis would be parallel to the $z$-axis of the hollow conductor.

In FIGURES 8 and 8*a*, a field corresponding to an $E_{11}$ mode is assumed within the cylindrical wave guide. The piezoelectric body 1 is located within the field in such a manner, that the surface vector of one of the large surfaces of the body is parallel to the $z$-axis of the hollow conductor and based on an oscillating pattern according to FIGURE 1*a*, the P-axis of the body is parallel to the diameter connecting the two longitudinal field lines with one another, or based on an oscillating pattern according to FIGURE 1*c* is parallel to the radius $r$ for $\beta=\pi/2$.

A cylindrical wave guide 6 in which an $H_{10}$ mode is generated is shown in FIGURES 9 and 9*a*. In this case, the piezoelectric body 1 is arranged within the electric field in such a manner, that the surface vector of one of the large surfaces is parallel to the radius $r$ for $\beta=\pi/2$ of the wave guide.

Figure 10:
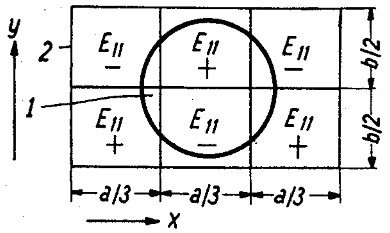

FIGURE 10 illustrates the cross section of a rectangular wave guide 2, wherein it is assumed that a field corresponding to an $E_{32}$ wave is generated. The disk-shaped piezoelectric body 1 is arranged within this field in such a manner, that the surface vector of one of the large surfaces is parallel to the $z$-axis of the wave guide and, based on an oscillating pattern according to FIGURES 1$a$ or 1$b$, the P-axis of the body is parallel to the $y$-axis, based on an oscillating pattern according to FIGURE 1$c$, is parallel to the $x$-axis of the wave guide coordinate system.

Figure 11:
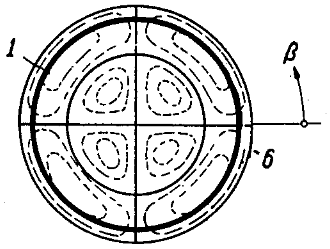

A round wave guide 6 is shown in FIGURE 11, wherein an electric field of the $E_{22}$ mode is assumed. In this figure, the magnetic field lines are shown in full lines. The disk-shaped piezoelectric body 1 is located within the field in such a manner, that the surface vector of one of the large surfaces is parallel to the $z$-axis of the wave guide, and based on an oscillating pattern according to FIGURE 1$a$, the P-axis of the body is parallel to the radius $r$ for $\beta=\pi/4$, or based on an oscillating pattern according to FIGURE 1$b$, is parallel to the radius $r$ for $\beta=0$.

Figure 12:
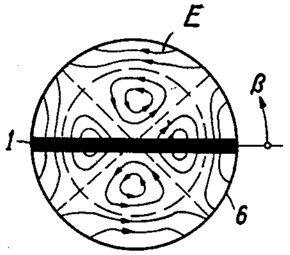

FIGURE 12, likewise, shows the case of a cylindrical wave guide 6 in which, however, an electric field corresponding to an $H_{22}$ mode is assumed. The disk-shaped piezoelectric body 1 is arranged in this field in such a manner, that the surface vector of one of the large surfaces is parallel to the radius $r$ for $\beta=\pi/2$, and based on an oscillating pattern according to FIGURE 1$a$, the P-axis of the body is parallel to the radius $r$ for $\beta=0$, or based on an oscillating pattern according to FIGURE 1$c$ is parallel to the $z$-axis of the wave guide.

Figure 13:
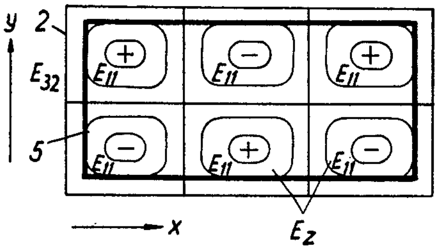

FIGURE 13 shows the cross section of a rectangular wave guide in which an $E_{32}$ mode is generated. A disk-shaped piezoelectric body 5 of rectangular body configuration is provided in the field, said body filling the wave guide cross section to a great extent and wherein the surface vector thereof is parallel to the $z$-axis of the wave guide.

Figure 14:
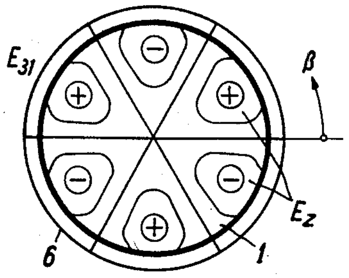

FIGURE 14 illustrates the case of a cylindrical wave guide 6 in which an $E_{31}$ wave is generated. A disk-shaped circular piezoelectric body 1 is provided in this field in such a manner, that the surface vector of one of its large surfaces is parallel to the $z$-axis of the wave guide and, based on an oscillating pattern according to FIGURE 1$a$, or 1$b$, the P-axis of the body is parallel to the radius $r$ for $\beta=\pi/2$, or based on an oscillating pattern according to FIGURE 1$c$, is parallel to the radius $r$ for $\beta=0$.

Figure 15:
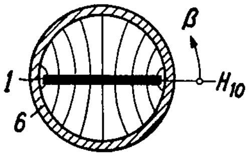

FIGURE 15 illustrates a disk-shaped piezoelectric body 1 of round configuration or, if desired, of rectangular shape in coaction with an $H_{10}$ wave of a round hollow conductor 6.

Figure 16:
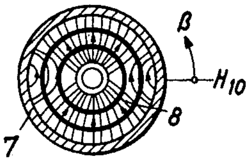
FIGURE 16 shows a sectional view through a coaxial line excited in the $H_{10}$ mode with an annular piezoelectric body located therein.

FIGURE 16 shows the use of a coaxial hollow line 7 in which, based on a field corresponding to an $H_{10}$ mode, an annular piezoelectric body 8 is provided, wherein the surface vector of one of the annular surfaces is parallel to the $z$-axis of the line.

Figure 17:
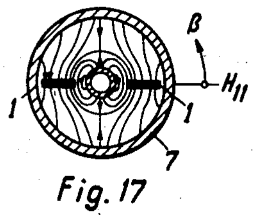
FIGURE 17 shows a sectional view through a coaxial line excited in the $H_{11}$ mode and having two piezoelectric bodies located therein.

FIGURE 17 illustrates a system having two disk-shaped circular piezoelectric bodies 1 in coaction with the $H_{11}$ mode within a coaxial hollow line 7.

Figure 18:
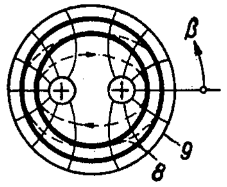
FIGURE 18 shows a shielded double line in cross section and shows an annular piezoelectric body surrounding the inner conductors.

The case of a shielded double-line 9 is shown in FIGURE 18, wherein the two inner conductors of the double-line have the same potential in each of the cross-sectional planes. An annular piezoelectric body surrounding two inner conductors is arranged in this case in such a manner, that the surface vector of one of its annular surfaces is parallel to the $z$-axis of the conductor.

Figure 19:
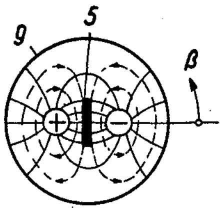
FIGURE 19 shows in cross section a shielded double line, but wherein the piezoelectric body is between the two conductors.

A shielded double-line 9 is likewise shown in FIGURE 19, wherein, however, the inner conductors in each cross-section are referred to the potential of the outer conductor and have opposite potentials. The disk-shaped piezoelectric bodies 5 are provided between the two inner conductors in such a manner, that the surface vector of one of its large surfaces is parallel to the radius $r$ for $\beta=0$ of the conductor system if a rectangularly-shaped piezoelectric body is assumed. In case of a circular piezoelectric body and based on an oscillating pattern according to FIGURE 1$a$, the P-axis of the body shall be parallel to the $z$-axis of the conductor system, or based on an oscillating pattern according to FIGURE 1$c$, shall be parallel to the radius $r$ for $\beta=\pi/2$.

FIGURE 20 illustrates a system having a rectangular wave guide 2 in which several piezoelectric bodies 3 are arranged along the wave guide at places which correspond electrically to one another, i.e., are suitably based one half wave length from one another. This system can employ piezoelectric bodies of the same frequency to increase the coaction, or piezoelectric bodies of a somewhat different frequency for obtaining a pass band characteristic.

FIGURE 21 shows two disk-shaped piezoelectric bodies 1 of round section in a hollow conductor 4 of elliptical cross section in coaction with an $E_{01}$ mode.

FIGURE 22 illustrates a system of six piezoelectric bodies 1 in coaction with an $E_{11}$ mode in a round hollow wave guide 6.

In FIGURE 23, a rod-shaped piezoelectric body 5 is illustrated in coaction with the wave on a shielded double-line 9. The coaction of piezoelectric bodies with hollow wave guide waves can also be used to define for the electric field pattern a certain preferred direction, so that the tendency otherwise observed in certain modes to turn their polarization plane along the guide can be avoided. Thus, in this case, such a piezoelectric body or a series of bodies arranged one behind the other acts as an orienting means for the wave passing through the wave guide. In case of the shape of the electric field corresponding to an $E_{11}$ mode in a round wave guide to stabilize the orientation of the wave in the wave guide, at least two piezoelectric bodies may be provided in such a manner, that based upon oscillating patterns according to FIGURES 1$a$, 1$b$ or 1$c$, their Q-axes are parallel with respect to one another.

FIGURES 24$a$ and 24$b$ illustrate schematically the position of a piezoelectric body 1 in a round wave guide 6 and, it is assumed that an $E_{11}$ mode is generated in the guide. The field lines of the type shown in FIGURE 8 are indicated by circles within the conductor cross section of FIGURES 24$a$ and 24$b$. In the case of the position of the body according to FIGURE 24$a$, an intensive coaction between the field and the piezoelectric body takes place. However, this is not true in case of the orientation according to FIGURE 24$b$, i.e., in this case the wave has almost no energizing action on the piezoelectric body.

Components of the kind described can be used as parts of a frequency-sensitive attenuator, especially within a bridge filter, for constructing a filter having a band pass, or a band elimination or blocking characteristic. These components can also be applied as frequency-stabilizing members within a microwave generator, an example of which is shown in FIGURE 25. In this figure, reference character 10 denotes an amplifier of any design, the input and output of which are connected respectively to terminals of a branched wave guide system forming a bridge circuit arrangement in a manner known per se. As long as the impedances of the branches opposite one another are equal, the bridge is balanced and no energy will be conducted from the input of the bridge to its output. In case of the natural frequency of the piezoelectric body 1 arranged within the wave guide 6, the bridge will be detuned, so that at this position, energy will be transmitted from the input to the output and oscillation results. In this case, piezoelectric bodies in the hollow conductor can serve as a valuable substitute for the gas absorption cells heretofore used in such microwave generators.

We claim:

1. A frequency-sensitive selective filter system comprising an *n*-terminal network containing a flat, plate-like piezoelectric oscillating resonator free of electrodes, said network containing a portion of a high frequency transmission line carrying a high frequency wave having an oscillating component of a frequency corresponding to one of the natural frequencies of said piezoelectric resonator, the latter having at least one of its dimensions, taken across one of its larger surfaces, corresponding in order of magnitude to a quarter wave length of said oscillating component, the position of said piezoelectric resonator within the field of said transmission line being such that that portion of the field which intercepts said piezoelectric resonator and excites the latter as a frequency-selective resonator is, intermittently with respect to a substantially travelling wave and constantly with respect to a standing wave, non-homogeneous with the algebraic sign (±) of the direction of the lines of said field changing in such a manner that the distribution of the field coincides at least approximately to the distribution of the vibration pattern of said piezoelectric resonator at said frequency, thereby to provide close coupling for exciting said piezoelectric resonator.

2. A system according to claim 1, characterized in that the high frequency line is a hollow wave guide.

3. A system according to claim 1, characterized in that the high frequency line is a coaxial wave guide.

4. A system according to claim 1, characterized in that the high frequency line is a parallel conductor line.

5. A system according to claim 1, characterized in that the piezoelectric resonator is a Y-cut quartz resonator.

6. A system according to claim 1, characterized in that the piezoelectric resonator has the shape of a flat plate and at least one of its two larger surfaces is oriented substantially normal to the electric field lines.

7. A system according to claim 6, characterized in that the piezoelectric resonator is arranged in the field of a standing wave near a maximum of the electric field strength.

8. A system according to claim 6, characterized in that the center of gravity of the piezoelectric resonator lies approximately on the longitudinal axis of the transmission line.

9. A system according to claim 5, characterized in that in case of a rectangular wave guide and an $H_{10}$ wave propagation therein, the surface vector of at least one of the larger surfaces of the piezoelectric resonator is parallel to a transverse axis of the wave guide.

10. A system according to claim 5, characterized in that in case of a circular wave guide and an $H_{10}$ wave propagation therein, the surface vector of at least one of the larger surfaces of the piezoelectric resonator is parallel to a radius for $\beta=\pi/2$ of the hollow conductor, where $\beta$ is the azimuth designation in the plane transversely intersecting the circular wave guide.

11. A system according to claim 5, characterized in that in case of a wave guide and an $H_{11}$ wave propagation therein, the surface vector of at least one of the larger surfaces of the piezoelectric resonator is normal to the longitudinal axis of the wave guide and the piezoelectric body is placed close to the wave guide wall.

12. A system according to claim 5, characterized in that in case of a wave guide and an $H_{11}$ wave propagation therein, at least one of the larger surfaces of the piezoelectric resonator is parallel to the wave guide axis and disposed diagonally with respect to the walls of the wave guide.

13. A system according to claim 12, characterized in that the surface vector of one of the larger surfaces of the piezoelectric resonator is perpendicular to the longitudinal axis of the wave guide and the P-axis of the resonator is parallel to the diagonal $x=k\cdot y$ or is parallel to the $z$-axis of the wave guide.

14. A system according to claim 5, characterized in that in case of a circular wave guide and an $E_{01}$ wave propagation therein, the surface vector of at least one of the larger surfaces of the piezoelectric resonator is parallel to the longitudinal axis of the wave guide.

15. A system according to claim 5, characterized in that in case of a rectangular wave guide and an $E_{11}$ wave propagation therein, the surface vector of at least one of the larger surfaces of the piezoelectric resonator is parallel to the longitudinal axis of the wave guide.

16. A system according to claim 5, characterized in that in case of a rectangular wave guide and an $E_{32}$ wave propagation therein, the surface vector of at least one of the larger surfaces of the piezoelectric resonator is parallel to the longitudinal axis of the wave guide and the P-axis of the resonator is parallel to the $y$-axis or is parallel to the $x$-axis of the wave guide.

17. A system according to claim 5, characterized in that in the case of a rectangular wave guide and an $E_{32}$ wave propagation therein, said piezoelectric resonator is rectangular and is filling substantially the wave guide cross section and the surface vector of the piezoelectric resonator is parallel to the longitudinal axis of the wave guide.

18. A system according to claim 5, characterized in that in case of a circular wave guide and an $H_{01}$ wave propagation therein, a surface vector of one of the larger surfaces of the piezoelectric resonator is parallel to a radius of the wave guide cross section and the P-axis of the resonator is perpendicular to the longitudinal axis or is parallel to the longitudinal axis of the hollow conductor.

19. A system according to claim 5, characterized in that in case of a circular wave guide and an $H_{22}$ wave propagation therein, a surface vector of one of the larger surfaces of the piezoelectric resonator is parallel to the wave guide radius for $\beta=\pi/2$, and the P-axis of the resonator is parallel to the radius for $\beta=0$ or is parallel to the longitudinal axis of the hollow conductor.

20. A system according to claim 5, characterized in that in case of a circular wave guide and an $E_{11}$ wave propagation therein, a surface vector of one of the larger surfaces of the piezoelectric resonator is parallel to the longitudinal axis of the wave guide and the P-axis of the resonator is parallel to a diameter inter-connecting the two longitudinal field line bundles, or is parallel to the radius $r$ for $\beta=\pi/2$.

21. A system according to claim 5, characterized in that in case of a circular wave guide and an $E_{22}$ wave propagation therein, a surface vector of one of the larger surfaces of the piezoelectric resonator is parallel to the longitudinal axis of the wave guide and the P-axis of the resonator is parallel to the radius $r$ for $\beta=\pi/4$, or is parallel to the radius $r$ for $\beta=0$.

22. A system according to claim 5, characterized in that in case of a circular wave guide and an $E_{31}$ wave propagation therein, a surface vector of one of the larger surfaces of the piezoelectric resonator is parallel to the longitudinal axis of the wave guide and the P-axis of the resonator is parallel to the radius $r$ for $\beta=\pi2$, or is parallel to the radius $r$ for $\beta=0$.

23. A system according to claim 5, characterized in that in case of a coaxial transmission line and an $H_{10}$ wave propagation therein, said piezoelectric resonator is annular and has a surface vector of one of the annular surfaces parallel to the longitudinal axis of the transmission line.

24. A system according to claim 5, characterized in that in case of a shielded double transmission line, the two inner conductors of which have the same potential in each cross-sectional plane, an annular piezoelectric resonator is provided enclosing the two inner conductors and the surface vector of one of the annular surfaces is disposed parallel to the longitudinal axis of the transmission line.

25. A system according to claim 5, characterized in that in case of a shielded double transmission line, the inner conductors of which have opposite potentials in each cross-sectional plane with respect to the potential of the outer shield conductor, the surface vector of one of the larger surfaces of the piezoelectric resonator is disposed parallel to the shield radius $r$ for $\beta=0$ of the conductor transmission line, and in case of use of a circular piezoelectric resonator, the P-axis of the resonator is parallel to the longitudinal axis of the transmission line, or is parallel to the radius $r$ for $\beta=\pi/2$.

26. A system according to claim 1, characterized in that several piezoelectric resonators are disposed along a transmission line at points electrically corresponding to one another at multiples of one half wave length.

27. A system according to claim 1, in combination with a bridge filter and serving therein as a frequency dependent component having band pass properties.

28. A system according to claim 27, in combination with an amplifier, and said bridge serving as the frequency stabilizing member therein and forming therewith a microwave generator.

29. A system according to claim 1, characterized in that in case of a circular wave guide and an $E_{11}$ wave propagation therein, in order to stabilize the orientation of the wave in the wave guide, at least two piezoelectric resonators are disposed therein in such a manner, that their Q-axes are parallel with respect to one another.

References Cited by the Examiner

UNITED STATES PATENTS

| | | | |
|---|---|---|---|
| 2,275,452 | 3/42 | Meacham | 331—139 |
| 2,463,472 | 3/49 | Bach | 310—8.2 |
| 2,641,741 | 6/53 | Peterson | 331—139 |
| 2,643,280 | 6/53 | Bernier | 333—72 |
| 2,773,996 | 12/56 | Slater | 310—8.1 |
| 2,883,660 | 4/59 | Arenberg | 333—30 X |
| 3,012,211 | 12/61 | Mason | 333—30 |
| 3,037,174 | 5/62 | Bommel | 333—30 |

References Cited by the Applicant

UNITED STATES PATENTS 2,217,280 10/40 Koch.

OTHER REFERENCES

Baranskii: The Excitation of Hypersonic Frequencies in Quartz, Soviet Physics, Doklady, vol. 2, #3, pages 237–238, May–June 1957.

HERMAN KARL SAALBACH, *Primary Examiner.*

GEORGE N. WESTBY, BENNETT G. MILLER, *Examiners.*